United States Patent

Sokoler

[11] Patent Number: 6,111,927
[45] Date of Patent: Aug. 29, 2000

[54] METHOD AND APPARATUS FOR RESYNCHRONIZING TWO SYSTEM CLOCKS

[75] Inventor: Izydor Sokoler, Copenhagen K, Denmark

[73] Assignee: Nokia Mobile Phones Limited, Espoo, Finland

[21] Appl. No.: 08/889,415

[22] Filed: Jul. 8, 1997

[30] Foreign Application Priority Data

Jul. 11, 1996 [GB] United Kingdom .................... 9614587

[51] Int. Cl.[7] ................. H04L 7/00; H04B 7/00
[52] U.S. Cl. .......................... 375/365; 455/38.3
[58] Field of Search .................... 375/365, 360, 375/354, 364; 370/304, 509, 514, 512, 511, 503; 455/343, 38.3, 574

[56] References Cited

U.S. PATENT DOCUMENTS

| | | | |
|---|---|---|---|
| 5,408,504 | 4/1995 | Ostman | 375/354 |
| 5,590,160 | 12/1996 | Ostman | 375/367 |
| 5,740,517 | 4/1998 | Aoshima | 455/38.3 |
| 5,758,278 | 5/1998 | Lansdowne | 455/343 |
| 5,790,941 | 8/1998 | Peponides | 455/87 |
| 5,815,819 | 9/1998 | Ohta et al. | 455/574 |
| 5,845,204 | 12/1998 | Chapman et al. | 455/343 |

FOREIGN PATENT DOCUMENTS

| | | |
|---|---|---|
| 2297884 | 8/1996 | United Kingdom . |
| WO 95/10141 | 4/1995 | WIPO . |

Primary Examiner—Chi H. Pham
Assistant Examiner—Khai Tran
Attorney, Agent, or Firm—Perman & Green, LLP

[57] ABSTRACT

A radio telephone system clock is resynchronized in idle mode in relation to an associated transmitter/receiver station system clock, e.g. a fixed part for the DECT system, by counting the number of clock pulses between two detections of the preamble and the sync word of the DECT signal and using the counter status for determining a correction value. In addition to the system clock, a clock device comprises at least a further clock. A counter device counts the clock pulses from the clock, and a control device monitors the status of the counter device and activates the detecting means in response thereto when the status corresponds to the estimated arrival of the next preamble. The control device is adapted to register the status of the counter device when the detecting means detect the preamble and to correct the activation time of the detecting means for the next preamble for detection in response thereto.

11 Claims, 3 Drawing Sheets

METHOD AND APPARATUS FOR RESYNCHRONIZING TWO SYSTEM CLOCKS

BACKGROUND OF THE INVENTION

The invention concerns a method of resynchronizing a radio telephone system clock in relation to an associated transmitter/receiver station system clock in idle mode, a resynchronization device for resynchronizing a radio telephone system clock, and a radio telephone having such a resynchronization device.

According to the European digital cordless telephone system (DECT), a portable telephone in locked idle mode is to resynchronize its timing in relation to its fixed part with a predetermined frequency. A DECT signal is divided into time slots and frames, where a multiframe corresponds to 16 frames, and each frame consists of 24 slots (TDMA), each having 480 bits. As the fixed part transmits data at a bit rate of 1,152 Mbits/sec., 184320 data bits will be transmitted during a multiframe. Even the best system clock will have an inaccuracy corresponding to at least 6–7 bits during such a period. Of course, it is possible to resynchronize the timing of the portable telephone more frequently, but this requires that the telephone actively tries to resynchronize the timing more frequently than prescribed by the standard, which means that the telephone is active for a relatively longer time resulting in decreased standby time.

This inaccuracy increases to at least about 12 bits, when the system with the clock is in sleep mode without any form of clock correction or feedback. This inaccuracy in the estimation of the time slot start causes some serious problems. To be certain that the synchronization algorithm has started before the first bit in the preamble sequence, the synchronization algorithm must be started at bit position minus 12 (with 12 bit inaccuracy). This involves the risk that, at worst, the synchronization algorithm starts already at bit position minus 24. In that case, the synchronization algorithm will search for the preamble in pure noise (no carrier on the antenna), involving a non-negligible risk of the noise causing detection of a false preamble because of the frequency modulation and the IF filter bandwidth. Finally, the portable telephone will have difficulty in transmitting at the correct frequency to the fixed part, if the frame synchronization is not correct.

SUMMARY OF THE INVENTION

In accordance with the invention a predetermined part occurring periodically in the digital signal is detected, and then the clock pulses in at least one clock signal are counted. The detection of the next predetermined part is activated in response to the count, and the count is registered at the detection of the predetermined part, so that the activation time for the detection of the next part for detection may be corrected in response thereto. The invention is based on the finding that even though the system clocks in the fixed part and the portable part may drift up to 10–12 bits with respect to each other over a multiframe, the error will recur from multiframe to multiframe. Determination of the size of the error enables easy compensation for it in a subsequent multiframe. Then the start time of the predetermined part, e.g. the preamble of a DECT signal, may be determined with an inaccuracy of 1–2, thereby essentially eliminating the risk of detecting false preambles.

The invention provides a resynchronization device making it possible to predict the time of well-defined parts of a bit sequence on the basis of the preceding bit sequence.

The resynchronization device of the invention preferably resynchronizes the radio telephone system clock in idle mode with an associated transmitter/receiver station system clock (fixed part, wireless fixed part, repeater or the like) and comprises means to detect a predetermined part occurring periodically in a digital signal, a clock device to supply at least one clock signal, a counter device adapted to count the clock pulses in the at least one clock signal of the clock device, and a control device to monitor the status of the counter device. When the status of the counter device corresponds to the estimated arrival of the predetermined part in the bit sequence, the control device activates the detecting means in response thereto. The control device registers the status of the counter device when the detecting means detect the predetermined part, and corrects the activation time of the detecting means for the next part for detection in response thereto. Reading of the detection time allows the temporal difference between the expected and the actual time to be used for correcting the estimate of the arrival of a later preamble. Thus, a form of feedback correction is introduced in the system.

When the resynchronization device of the invention is used in a DECT telephone, the detecting means may comprise a correlator which correlates the digital signal with a predetermined correlation word. Thus, there will be a search for a frame preamble (a sequence of alternating bits) and the SYNC word (a predefined bit pattern determined by ETSI). As the DECT signal has a periodic preamble, the correlation word corresponds to a plurality of the periods of the preamble. The resynchronization may e.g. be performed once for each multiframe.

In a preferred embodiment of the invention, the clock device in the resynchronization device comprises a first clock supplying a clock signal at 1.152 kHz, and a second clock supplying a clock signal at 32.768 kHz. A first counter counts the number of pulses from the first clock, and a second counter counts the number of pulses from the second clock. The idle mode is split, so that the first counter is active during the synchronization mode and switched off during the sleep mode between two synchronizations, while the second counter is active during the sleep mode. The telephone has a system clock, which supplies a clock signal at 10.368 MHz, from which the first clock signal at 1152 kHz may be formed by means of a frequency divider which divides the frequency by a factor 9. The telephone system clock is thus switched off during the sleep mode and is thus just active during the actual synchronization. When the counters are dimensioned correctly, the most energy-consuming clocks may thus be kept switched off for most of the time and will thus just be active during the actual synchronization, which lasts e.g. about 250 $\mu$s of the 160 ms of the cycle.

In a preferred embodiment, the control device starts the first counter at the detection of the predetermined part (preamble and SYNC word and calculates back to the start of the preamble), and allows the first counter to count to a first, predetermined value, e.g. 200, which takes about 174 $\mu$s. The control device then stops this counter and the value is maintained. The second counter is started, and it counts to a second, predetermined value, e.g. 5235, which takes about 159.76 ms. The control device then stops this counter and starts the first counter again and allows it to count to a third, predetermined value, e.g. 277, which takes about 67 $\mu$s. The sum of the three intervals is selected so as to correspond to 160 ms or a multiframe, since a multiframe in the preferred embodiment corresponds to the preferred synchronization periodicity. The control device then activates the detecting means, and when the first counter reaches this third predetermined value, corrected by a value determined by an earlier detection, the preamble is expected to start, and then the active search begins. Since the preamble and the SYNC word each consist of 16 bits, the detection of the SYNC word takes place 32 bits after the start of the preamble, and therefore the first counter, which has already started from zero, is reset at a value (32) corresponding to the detection time with respect to the start time of the predetermined part, and the difference between the value of the counter before reset and the start time value is used as a correction value in the estimation of the start time of the next, searched preamble.

BRIEF DESCRIPTION OF THE DRAWINGS

The invention will be explained more fully below, by way of example only, in connection with a preferred embodiment and with reference to the drawing, in which FIG. 1 schematically shows a preferred embodiment of a resynchronization device according to the invention in a DECT telephone.

DETAILED DESCRIPTION OF THE INVENTION

Figure 3:
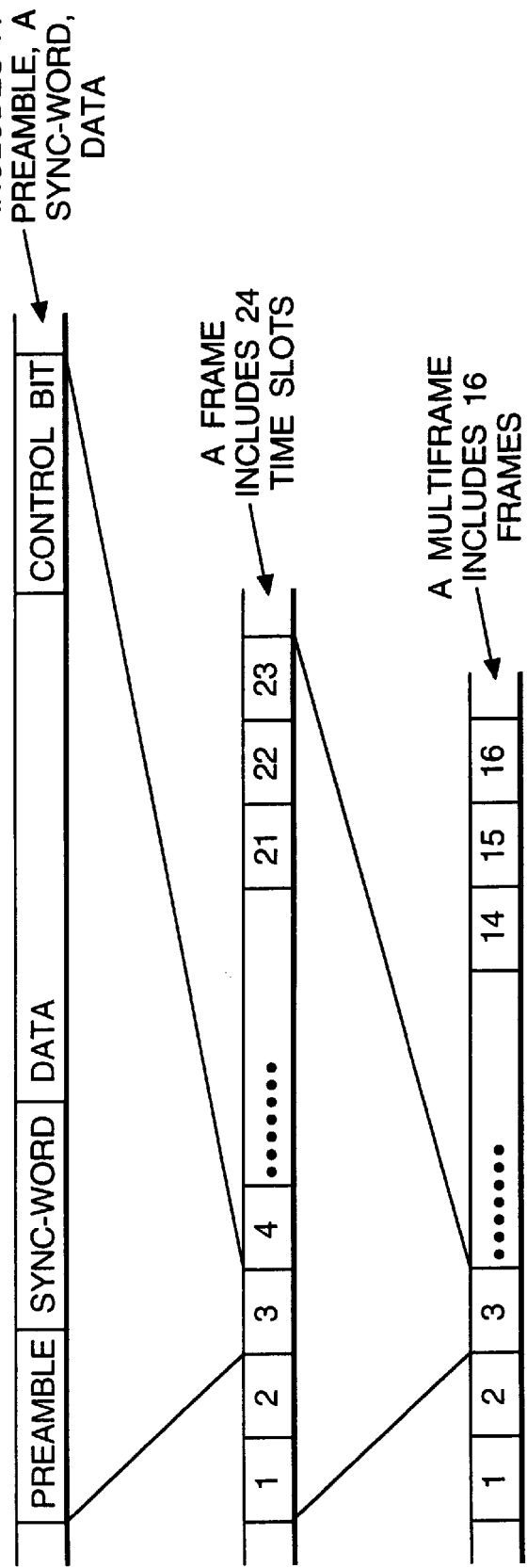
FIG. 3 shows the structure of DECT signals according to ETSI's standards.

The invention will be explained below with reference to a preferred embodiment of the invention used in connection with a DECT system, which has a signal structure as described in ETSI's proposal for standard ETS 300 175. The signal structure is shown in FIG. 3. Data are transferred as time-multiplexed data (TDMA) in time slots according to the DECT standard, and a time slot consists of a preamble having sixteen alternating bits, a SYNC word having sixteen bits in a predetermined bit pattern, data bits and a plurality of terminating control bits. A time slot contains up to 480 bits in all. Twenty-four successive time slots form a frame, and a telephone connection typically has two time slots allocated to it (one for each way) in the frame. Sixteen frames form a multiframe, which has a length of 160 ms because of the signalling rate of 1.152 Mbits/s.

Figure 1:
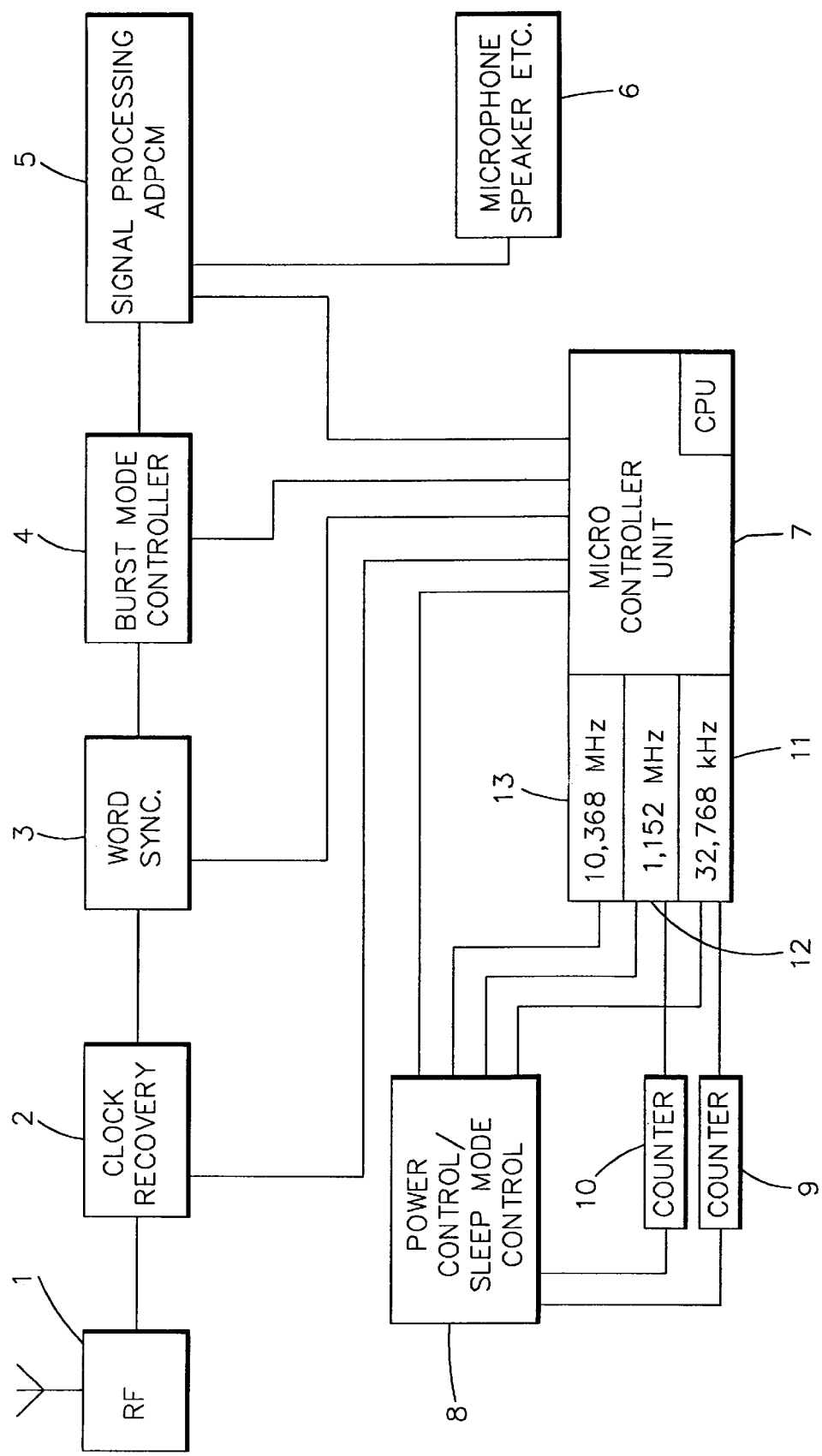

A preferred embodiment of a portable DECT telephone according to the invention will be explained in connection with FIG. 1. The telephone receives a time-multiplexed signal of the type shown in FIG. 3 via an RF circuit. The digital signal is fed from the FM detector of the RF circuit 1 to a clock recovery unit 2, in which the preamble consisting of sixteen alternating bits is detected. This detection may advantageously be performed with a correlator, where the signal is compared with a correlation word corresponding to a section of the preamble. The actual clock recovery procedure may comprise oversampling the digital signal with a bit rate of 1.152 Mbits/s by e.g. a factor nine prior to the correlation, following which the most optimum phase in the system clock (10.368 MHz/9=1.152 MHz) is found by the correlation. When the correlation degree between the digital signal and the correlation word exceeds a predetermined threshold value, the preamble is considered to be detected. The actual clock recovery unit 2 is described in detail in UK Patent Application No. 9602585.3, and a particularly expedient correlation register is described in detail in UK Patent Application No. 9602566.3. These two patent applications are hereby incorporated by reference in the present application. When the preamble has been detected, the SYNC word detector 3 begins to search for the SYNC word. This takes place by comparing the digital signal with a sixteen bit long correlation word corresponding to the SYNC word, and when the correlation degree exceeds a predetermined threshold value, the SYNC word is considered to be detected.

When synchronization has been obtained in talk mode, the digital signal is fed to a burst mode controller 4, in which data are demultiplexed and converted by buffers into an ADPCM signal in the form of a continuous bit flow which is passed to a signal processor 5, in which the talk signal is ADPCM-decoded, filtered and amplified before being fed to a user interface 6 in the form of a loudspeaker. The talk signal is fed from a microphone in the user interface 6 via the signal processor 5 to the burst mode controller 4, in which it is TDMA-multiplexed and transferred to the RF circuit 1.

When synchronization has been obtained in idled locked mode, the telephone continues in this mode until the next resynchronization time. If resynchronization is not obtained, the telephone leaves the idle locked state and normally enters the active unlocked state, from which it is attempted to re-establish the synchronization with a view to returning to the idle locked state.

A microcontroller unit 7 having a CPU controls i.a. the timing in the above-mentioned units. In the preferred embodiment, the MCU 7 is associated with three clocks 11–13 which apply clock pulses at the frequencies 32.768 kHz, 1.152 MHz and 10.368 MHz.

According to a standardization proposal from ETSI, a portable telephone is to resynchronize its timing with at least a predetermined frequency when the telephone is in the idle locked state. In the illustrated embodiment, the resynchronization is performed once per multiframe, and the resynchronization is controlled by a power control/sleep mode control unit 8 having two counters 9 and 10.

Once the telephone is in the idle locked state, the control unit 8, in the preferred embodiment, performs the following course in a cycle of a duration of 160 ms. From the start of a time slot where synchronization has been detected, the MCU 7 causes the counter 10 to count from zero and upwards. The counter 10 counts the clock pulses from the clock 12 (1152 kHz), and as long as the counter 10 is active, the synchronization device and thereby the telephone are in an active synchronization mode during the idle locked state. In this active synchronization mode, the system clock 13 is resynchronized in the portable part to the system clock in the fixed part.

Figure 2:
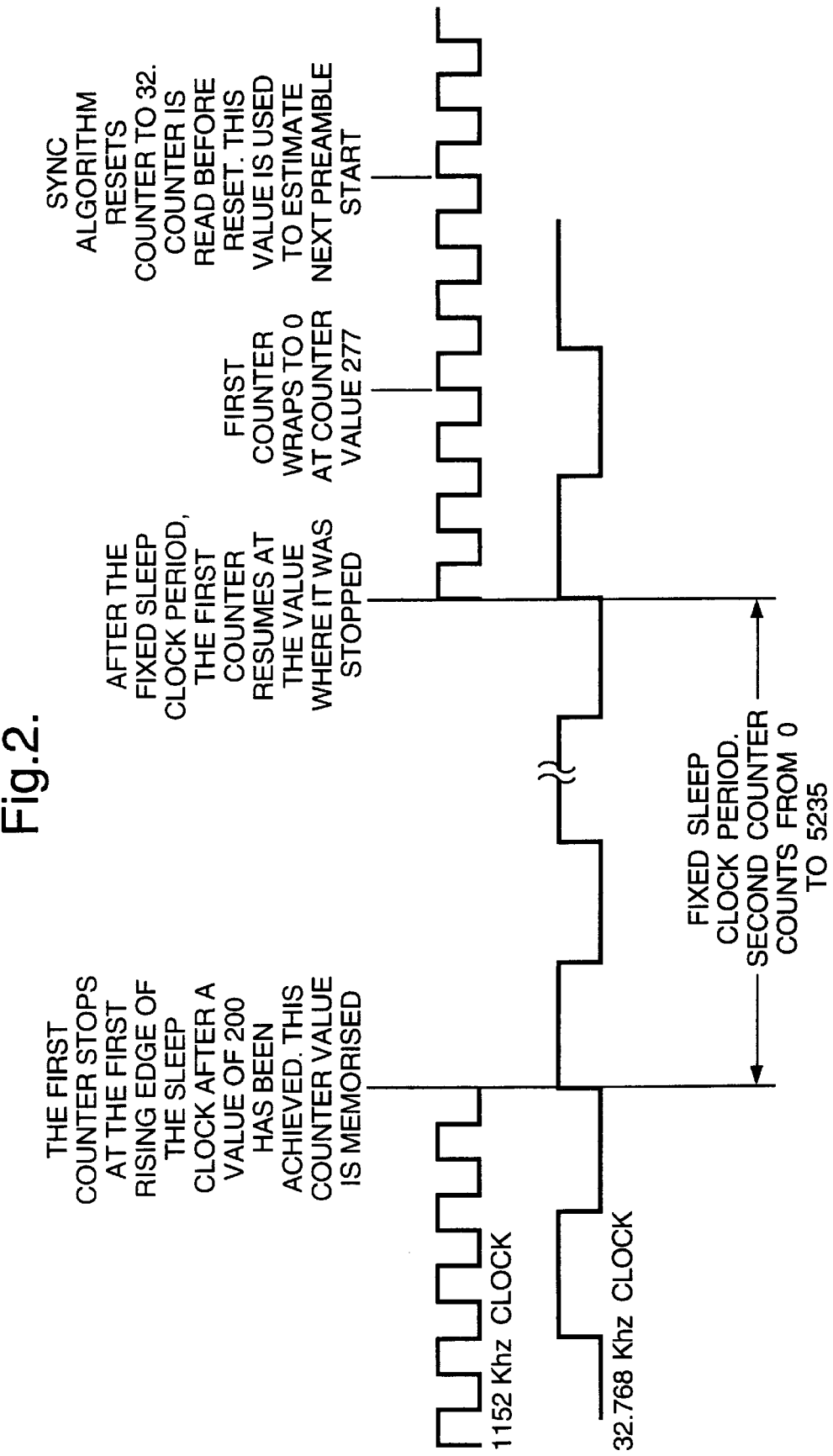
FIG. 2 illustrates the clock signal course in a resynchronization device according to the invention.

When the counter 10 reaches 200, it is stopped by the MCU 7 at the first rising flank in the clock signal from the clock 11 (32.768 kHz), which is illustrated in FIG. 2. The MCU 7 ensures at the same time that the telephone changes from the active synchronization mode to a sleep mode during the idle locked state, and the system clock 13 as well as other power-consuming and non-used components are switched off. At the start of the sleep mode, the second counter 9 begins to count from zero and upwards. The second counter 9 counts the number of clock pulses from the clock 11 and counts in 5235 periods. This corresponds to 159.76 ms, which is the duration of the sleep mode. The MCU 7 starts the system clock 13 and the active synchronization mode when the counter 9 reaches 5235. The first counter 10 is started simultaneously and continues to count from 200 and upwards. When the counter 10 reaches 277 in the active synchronization mode, it wraps around and continues to count upwards from zero again. When the SYNC word detector 3 detects the SYNC word, the counter 10 is set at the value 32, which corresponds to the detection time for the SYNC word with respect to the start of the preamble, as the SYNC word is terminated at bit position 32. The contents of the counter 10 are registered immediately prior to resetting, the counter status being set at the value 32. The difference between the counter contents prior to resetting and the value indicates the counter contents at which the next preamble for detection starts. If the counter contents prior to resetting were 39, the next preamble for detection starts when the counter assumes the value 7 (39−32=7), and if the value prior to resetting was 29, the next preamble for detection starts when the counter assumes the value 275 (29−32=−3, which corresponds to three pulses prior to resetting, and 278−3=275). The circumstance that the clock drift from cycle to cycle is practically negligible is turned to account here, while, seen over an extended period of time, the drift may be quite considerable because of variations in the surroundings.

The invention makes it possible to estimate the start time of a preamble for detection, without necessarily having to use the system clock, which is the most stable and power-consuming clock in the entire system. As in case of standby a DECT telephone is in the idle locked state for a considerable part of the time, the sleep mode results in a considerable reduction in the power consumption in this mode, which in turn results in an extension of the standby time.

The proportion between the lengths of the active synchronization mode and the sleep made should desirably be made as small as possible owing to the overall power consumption, while the telephone should still be able to resynchronize its system clock with respect to the system clock of the fixed part. The wraparound values of the counters are selected so that this proportion is taken into consideration, while the counter cycle corresponds to the required resynchronization cycle, as 278 pulses/1152 kHz+5235 pulses/32.768 kHz=160 ms. The wrap-around values may be adapted if the synchronization mode is to be made shorter or longer, or if the overall cycle length is to be changed. The stated counter values may be modified as needed, since the telephone, although it is in sleep mode, must of course be able to start its microprocessors, its synthesis algorithms, etc. after the stop of the sleep mode, and before the preamble and the SYNC word are expected to arrive. It will likewise be appreciated by a skilled person that owing to stability the clocks must be switched on a little before the counters begin to count their pulses. The fast clock is thus to be switched on at a counter status of the second counter of about 5200 to be stable at the counter status 5235.

What is claimed is:

1. A method of resynchronizing a radio telephone system clock in relation to an associated transmitter/receiver station system clock in idle mode, comprising steps of:
    detecting a predetermined part occurring periodically in a digital signal;
    assuming that one of said predetermined parts will occur after a certain number of clock pulses;
    counting the clock pulses in at least one clock signal;
    activating a search for said predetermined part in response to the clock pulse count;
    registering said clock pulse count upon the detection of said predetermined part; and
    correcting said certain number of clock pulses for the detection of the next part in response to the registered clock pulse count.

2. A method according to claim 1, further comprising:
    counting the clock pulses from a first clock by a first counter which is active during the synchronization mode;
    counting the clock pulses from a second clock by a second counter which is active during a sleep mode;
    starting the first counter to count to a first, predetermined value, upon the detection of said predetermined part;
    starting the second counter to count to a second, predetermined value when said first counter has reached said first predetermined value;
    starting said first counter to count from the first predetermined value towards a third predetermined value when said second counter has reached said first predetermined value; and
    activating the search for said predetermined part when said first counter has reached said third predetermined value.

3. A resynchronization device for a radio telephone for resynchronizing, in idle mode, a radio telephone system clock having an associated transmitter/receiver station system clock, comprising:
    means for detecting a predetermined part occurring periodically in a digital signal;
    a clock device to supply at least one clock signal;
    a control device for estimating a certain number of clock pulses based on an assumption that one of said predetermined parts will occur after said second number of clock pulses;
    a counter device for counting the clock pulses in said at least one clock signal;
    wherein said control device monitors the status of the counter device and activates the detecting means in response thereto when the counter status corresponds to said certain number of clock pulses; and
    said control device is moreover adapted to register the status of the counter device when the detecting means detect the predetermined part, and to correct said certain number of clock pulses for the detection of the next part in response to the registered clock pulse count.

4. A resynchronization device according to claim 3, wherein the detecting means comprise a correlator correlating the digital signal with a predetermined correlation word.

5. A resynchronization device according to claim 4, wherein the digital signal is a DECT signal having a periodic preamble, and wherein the correlation word corresponds to a plurality of periods of the preamble.

6. A resynchronization device according to claim 5, wherein the radio telephone is resynchronized once for each multiframe, and wherein the detecting means are caused to detect each 384 preamble.

7. A resynchronization device according to claim 3, wherein the clock device comprises:
    a first clock supplying a clock signal at 1152 kHz, and a second clock supplying a clock signal at 32.768 kHz;
    wherein a first counter counts the number of pulses from the first clock, and a second counter counts the number of pulses from the second clock; and
    the first counter is active during the synchronization mode and is switched off during the sleep mode between two synchronizations, the second counter being active during the sleep mode.

8. A resynchronization device according to claim 7, wherein the clock device moreover comprises a third clock, which is the system clock of the telephone, and which supplies a clock signal at 10.638 MHz, and wherein the third clock is switched off during the sleep mode.

9. A resynchronization device according to claim 7, wherein:

the control device starts the first counter prior to the detection of the predetermined part and allows said first counter to count to a first, predetermined value;

the control device, when said first value is reached, stops the first counter and starts the second counter and allows said second counter to count to a second, predetermined value;

the control device, when said second value is reached, stops the second counter and starts the first counter, and allows said first counter to count from the first, predetermined value to a third, predetermined value; and the control device, when the first counter reaches said third, predetermined value, activates the detecting means.

10. A resynchronization device according to claim 9, wherein the control device, when the detecting means detect the predetermined part, sets the first counter at a value corresponding to the detection time in relation to the start time of the predetermined part.

11. A radio telephone having a resynchronization device according to claim 3.

* * * * *